United States Patent [19]

Ishii

[11] Patent Number: 5,195,486
[45] Date of Patent: Mar. 23, 1993

[54] TWO STROKE DIESEL ENGINE

[75] Inventor: Mitsunori Ishii, Kanagawa, Japan

[73] Assignee: Nissan Motor Co., Ltd., Yokohama, Japan

[21] Appl. No.: 797,870

[22] Filed: Nov. 26, 1991

[30] Foreign Application Priority Data

Nov. 28, 1990 [JP] Japan .................................. 2-326242

[51] Int. Cl.⁵ ............................................. F02B 19/04
[52] U.S. Cl. .................................... 123/257; 123/289; 123/65 VD
[58] Field of Search ................ 123/257, 65 S, 65 VD, 123/59 BS, 302, 305, 301, 289, 290, 275, 262, 263, 432, 90.16, 285, 270, 657, 658, 668, 193.3, 193.5

[56] References Cited

U.S. PATENT DOCUMENTS

| | | | |
|---|---|---|---|
| 4,070,999 | 1/1978 | Matsuno | 123/59 BS |
| 4,146,004 | 3/1979 | Dubois | 123/257 |
| 4,258,680 | 3/1981 | Eckert | 123/289 |
| 4,267,806 | 5/1981 | Kanda et al. | 123/263 |
| 4,616,605 | 10/1986 | Kline | 123/257 |
| 4,732,117 | 3/1988 | Tanahashi et al. | 123/65 VD |
| 5,009,207 | 4/1991 | Merritt . | |

FOREIGN PATENT DOCUMENTS 62-57733  4/1987  Japan .
1-315631 12/1989  Japan .

Primary Examiner—E. Rollins Cross
Assistant Examiner—M. Macy
Attorney, Agent, or Firm—Lowe, Price, LeBlanc & Becker

[57] ABSTRACT

A two stroke diesel engine having a cavity in the cylinder head facing the combustion chamber, an intake valve and exhaust-valve, a fuel injector, and a projection formed on the piston head. The intake valves and fuel injector are pointing toward the cavity while the exhaust valve is pointing toward the combustion chamber. The projection enters the cavity in the vicinity of the top dead center of the piston movement and separates it from the combustion chamber. Due to the loop effect of fresh gas flowing from the intake valve into the combustion chamber via the cavity, burnt gas is swept out of the chamber effectively, and due to the energy of combustion of fuel and air which ignited in the closed cavity, combustion rapidly spreads throughout the combustion chamber as the piston descends so that air is utilized efficiently.

5 Claims, 6 Drawing Sheets

TWO STROKE DIESEL ENGINE

FIELD OF THE INVENTION

This invention relates to a two stroke diesel engine, and more specifically the shape of the combustion chamber, the arrangement of fuel injection valves, and the arrangement of intake and exhaust valves in such an engine.

BACKGROUND OF THE INVENTION

Combustion chambers and injection systems for direct fuel injection in two stroke diesel engines are for example disclosed in Jikaisho No. 62-57733 and Tokkaihei No. 1-315631 published by the Japanese Patent Office.

In these engines, fuel is injected into the combustion chamber in the latter half of the compression step. This prevents the injection fuel from being blown out from the exhaust valve. However, due to this setting, insufficient conversion of fuel to fine particles and poor dispersion are apt to occur and fuel tends to mix poorly with air. This leads to poor fuel consumption performance and reduced power, and an undesirable composition of exhaust gases.

SUMMARY OF THE INVENTION

It is therefore an object of this invention to promote better mixing of fuel and air in a combustion chamber in a two stroke diesel engine.

It is another object of this invention to enhance a gas scavenging effect wherein fresh gases led into a combustion chamber in a two stroke diesel engine assist the expulsion of burnt gases.

It is yet another object of this invention to promote a more efficient combustion in a combustion chamber of a two stroke diesel engine.

This invention, in order to achieve the above objects, provides a two stroke diesel engine having a cylinder with an open end, a cylinder head having a bottom surface to close the open end of the cylinder, a piston accommodated in the cylinder such that it is free to slide in the cylinder between its top dead center and bottom dead center. This piston has a piston head facing the bottom surface of the cylinder head. A combustion chamber is formed in the cylinder by the piston head and the bottom surface of the cylinder head. This combustion chamber has a minimum capacity when the piston is at the top dead center. The engine also comprises a cavity formed in the cylinder head with an opening in the bottom surface, an intake valve fitted to the cylinder head and pointing toward the cavity, a fuel injector fitted to the cylinder head and pointing toward the cavity, an exhaust valve fitted to the cylinder head outside the cavity and pointing toward the combustion chamber, a cavity wall located between the intake valve and the exhaust valve, and a projection formed on the piston head such that it enters the cavity and separates the cavity from the combustion chamber when the piston is in the vicinity of the top dead center.

To achieve the above objects, this invention further provides a two stroke diesel engine having a cylinder with an open end, a cylinder head having a bottom surface to close the open end of the cylinder, a piston accommodated in the cylinder such that it is free to slide in the cylinder between its top dead center and bottom dead center. The piston has a piston head facing the bottom surface of the cylinder head. A combustion chamber is formed in the cylinder by the piston head and the bottom surface of the cylinder head. This combustion chamber has a minimum capacity when the piston is at the top dead center. The engine also comprises a cavity formed in the cylinder head with an opening in the bottom surface, a pair of intake valves fitted to the cylinder head and pointing toward the cavity, a fuel injector fitted to the cylinder head and pointing toward the cavity, a pair of exhaust valves fitted to the cylinder head outside the cavity and pointing toward the combustion chamber, a cavity wall located between the intake valves and exhaust valves, and a projection formed on the piston head such that it enters the cavity to separate the cavity from the combustion chamber when the piston head is in the vicinity of the top dead center. The cavity wall has a complex arc-shaped section being equidistant from the rim of each intake valve and forms an edge between the intake valves,

DESCRIPTION OF THE PREFERRED EMBODIMENT

Figure 1:
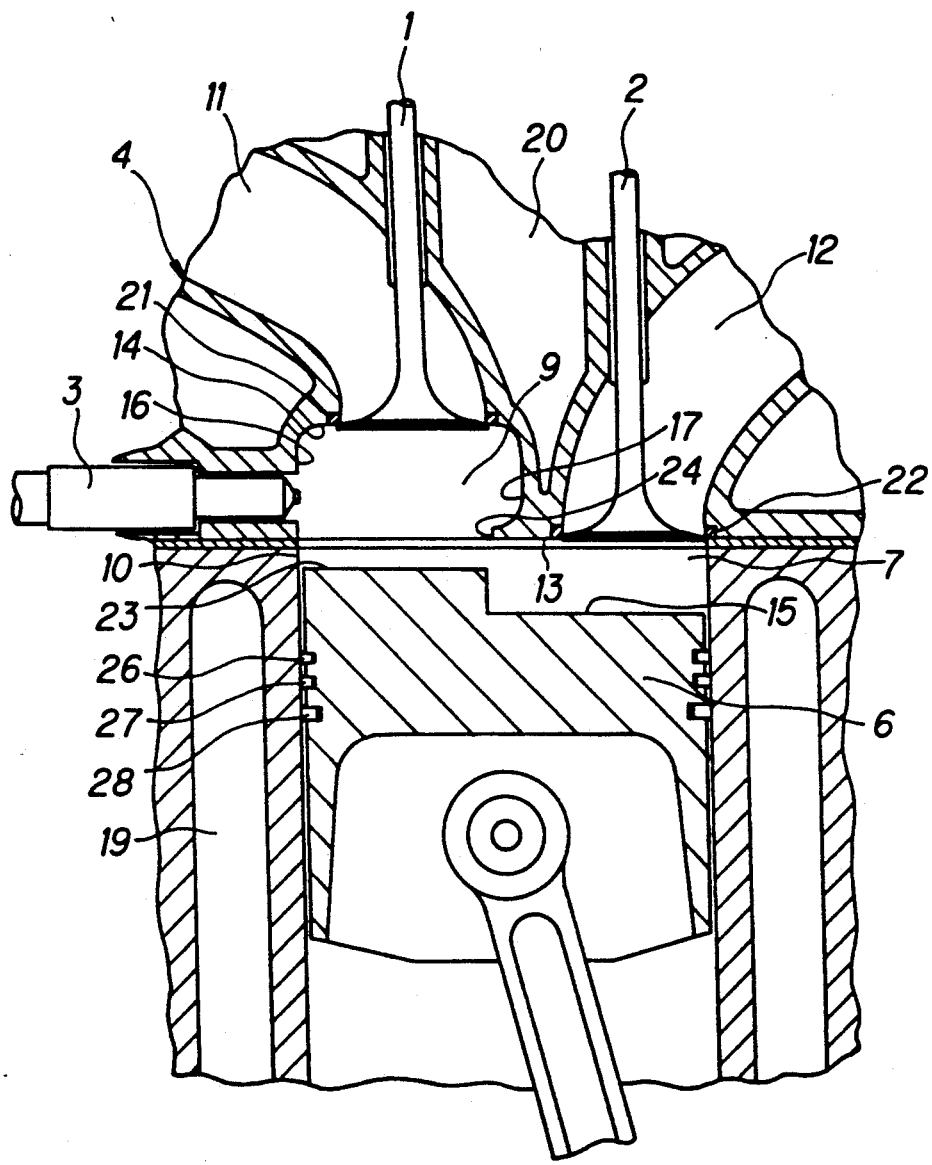
FIG. 1 shows a vertical section of a cylinder head and upper part of a cylinder along a center line of the cylinder in a two stroke diesel engine according to this invention.

The diesel engine shown in FIG. 1 is provided with a combustion chamber 7 formed in a cylinder 10 by a bottom surface 13 of a cylinder head 4 and a piston head 15 of a piston 6. A water jacket 19 is provided on the outside of the cylinder 10, and an identical water jacket is provided on the cylinder head 4.

Figure 2:
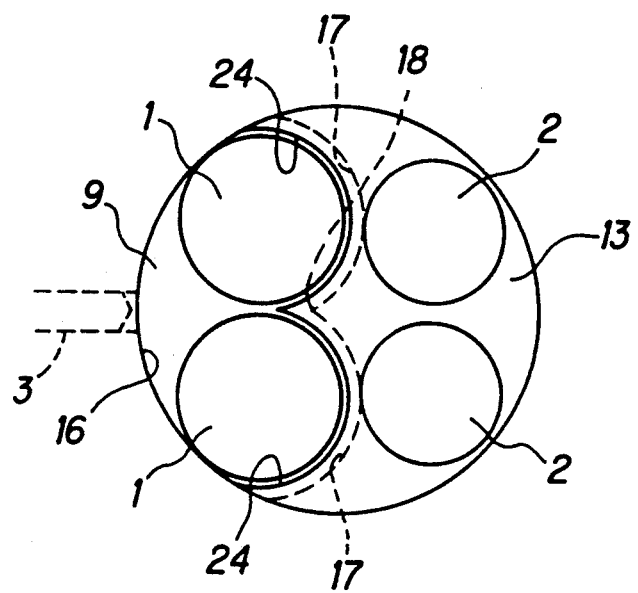
FIG. 2 is a plan view of the cylinder head viewed from a combustion chamber of the engine according to this invention.

A cavity 9 having an opening in the bottom surface 13 is formed in the cylinder head 4 and a pair of intake ports 11 opening downwards is formed in a roof 14 of the cavity 9. Similarly, a pair of exhaust ports 12 opening downwards is formed in the bottom surface 13. An intake valve 1 is fitted to each intake port 11, and an exhaust valve 2 is fitted to each exhaust port 12. The shapes and locations of cavity 9, the surface 13, and the intake valves 1 and exhaust valves 2 are shown in FIG. 2.

These valves 1 and 2 are arranged such that their center axes are parallel to the center axis of the cylinder 10. Each of the intake valves 1 is seated in a seat 21 which forms a part of the roof 14, while each of the exhaust valves 2 is seated in a seat 22 which forms a part of the surface 13.

The cavity 9 is delimited by the roof 14, a wall 17 and a cylinder extension wall 16. The wall 17 is formed between the roof 14 and the surface 13, and comprises two arcs set at a fixed distance from the rim of each intake valves 1 joined by an edge 18 to form a double cylindrical shape. On the bottom edge of the cylindrical wall 17, there is an arc-shaped guide 24 horizontally projection towards the center of the cavity 9.

The extension wall 16 is formed as an extension of the inner wall of the cylinder 10 in apposition to the cylindrical wall 17.

A projection 23 which closes the cavity 9 near the top dead center of the movement of the piston 6 is formed on the piston head 15. This projection 23 has a horizontal cross-section approximately resembling the cavity 9 and when the piston 6 rises, it passes between the extension wall 16 and the guide 24, there being a predetermined clearance between the piston 6 and these elements, and enters the cavity 9.

The top of the piston head 15 has a flat upper surface perpendicular to the central axis of the cylinder 10. The projection 23 also has a flat upper surface.

The roof 14 of the cavity 9 and the bottom surface 13 of the cylinder head 4 are also flat.

The projection 23 is formed at such a height that it closes the cavity 9 within a range of 10–20 degrees on either side of the top dead center of the piston 6. Further, at the top dead center of the piston 6, the volume of the combustion chamnber 7 is set at 30–50% of the total volume of the combustion chamber 7 and the cavity 9.

There are three piston rings 26, 27 and 28 fitted to the piston 6 such that they slide on the cylinder 10. These piston rings 26, 27 and 28 are disposed at a predetermined interval in the direction of the central axis of the cylinder 10, and guides the piston 6 up and down in the cylinder 10. It is preferable that the interval between these piston rings 26, 27 and 28 is made large so as to better maintain the orientation of the piston 6.

Figure 3:
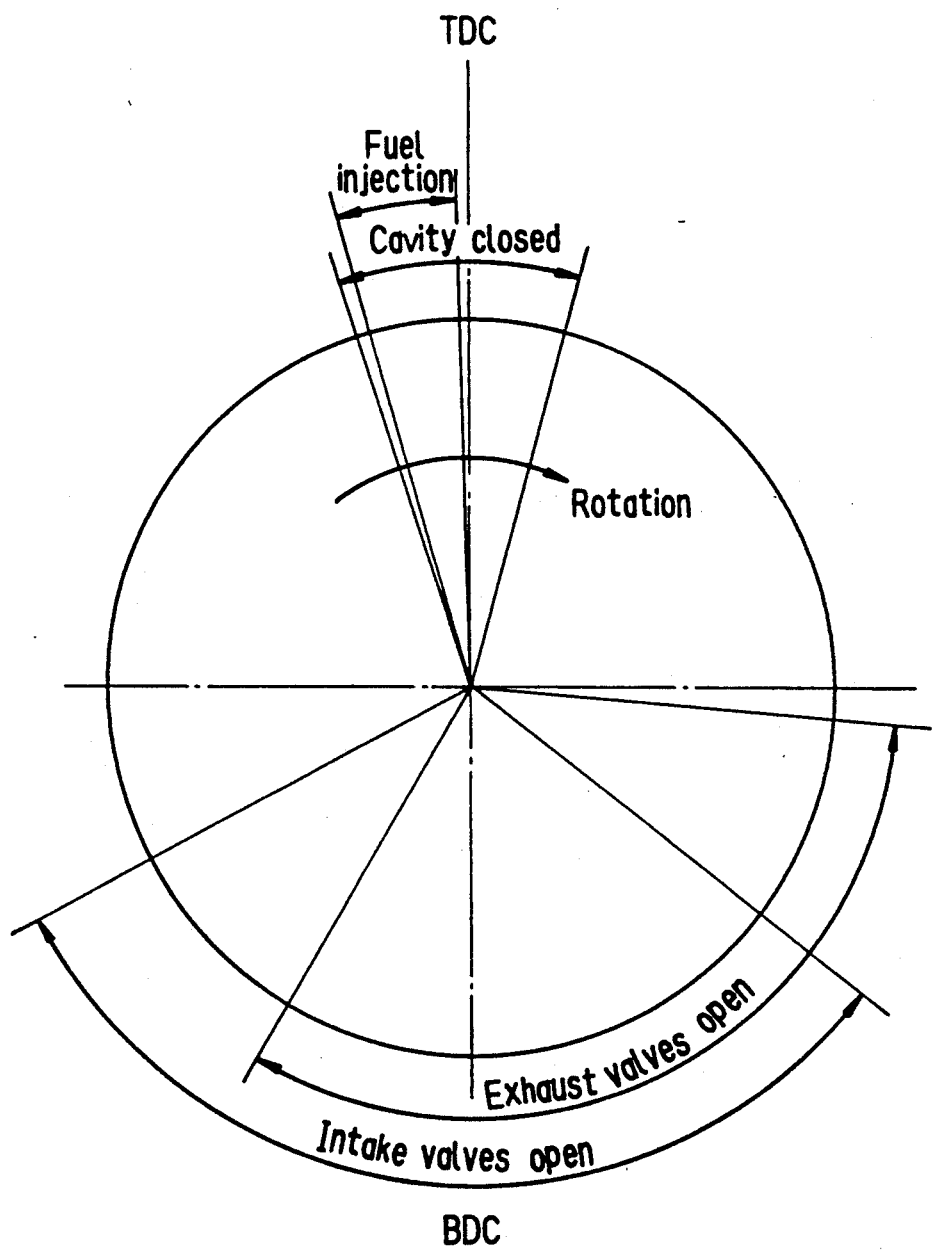
FIG. 3 is a graph showing opening and closing periods of intake and exhaust valves, timing of fuel injection, and their relation to a closing period of a cavity of the engine according to this invention.

A single fuel injector 3 is provided on the extension wall 16 of the cavity 9 with a substantially horizontal orientation and points toward the edge 18 of the cylindrical wall 17. The fuel injector 3 injects fuel towards the edge 18 depending on an aperture of a throttle valve of the engine and an engine speed. The fuel injection time is set slightly in advance of the top dead center (TDC) of the piston 6 as shown in FIG. 3.

The intake ports 11 are connected to a supercharger, not shown, which delivers fresh pressurized air to the engine. The intake valves 1 and exhaust valves 2 are actuated by cams, not shown, which are provided in the top of the cylinder head 4, and operate with the timing shown in FIG. 3 in synchronism with the engine.

The intake valves 1 open during the latter half of the descent of the piston 6, and shut during the first half of the rise of the piston 6 after it has passed bottom dead center (BDC). The exhaust valves 2 open before the intake valves 1, and shut before the intake valves 1. The opening period of the intake valves 1 therefore overlaps with the opening period of the exhaust valves 2 by a predetermined amount.

In this engine, fuel is injected and an explosion takes place each time the piston 6 rises. Air intake, compression, explosion and exhaust take place during one movement cycle of the piston 6 in the cylinder 10.

When the piston 6 descends, the exhaust valves 2 open, burnt gas is expelled from the exhaust ports 12, the intake valves 1 open, and fresh gas pressurized by the supercharger is introduced from the intake valves 1 into the cavity 9 and the combustion chamber 7.

Figure 4C:
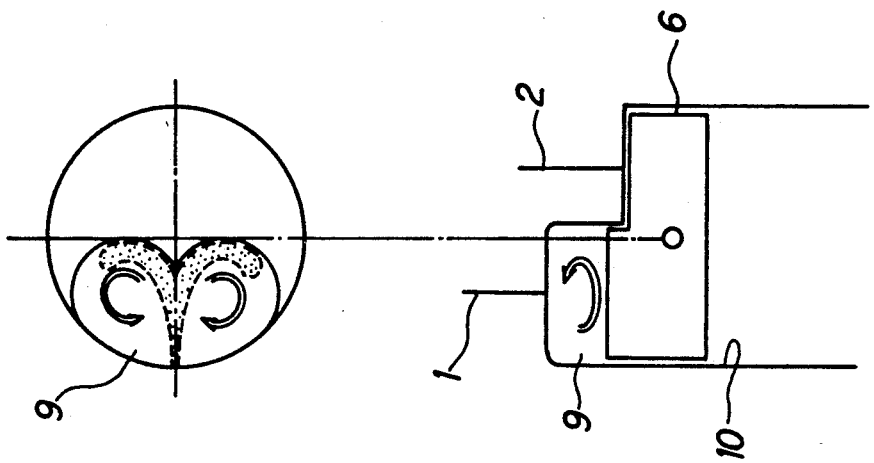
FIGS. 4a, 4b and 4c are schematic diagrams showing a flow of gases in the combustion chamber of the engine according to this invention.
Figure 4B:
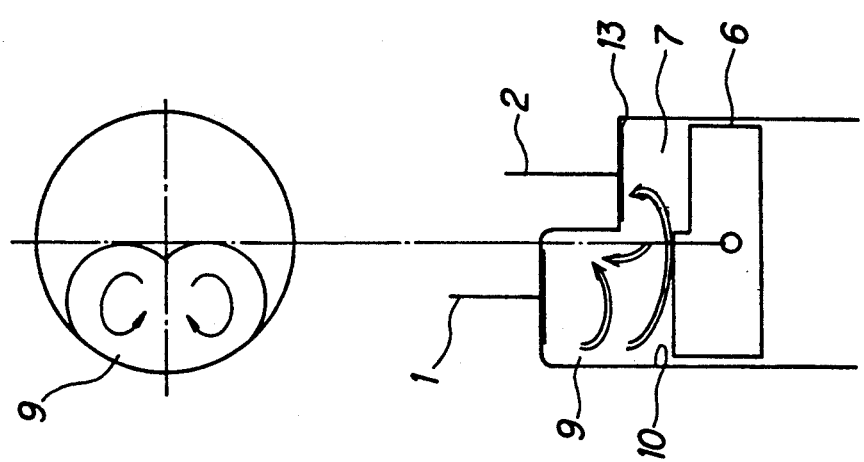
Figure 4A:
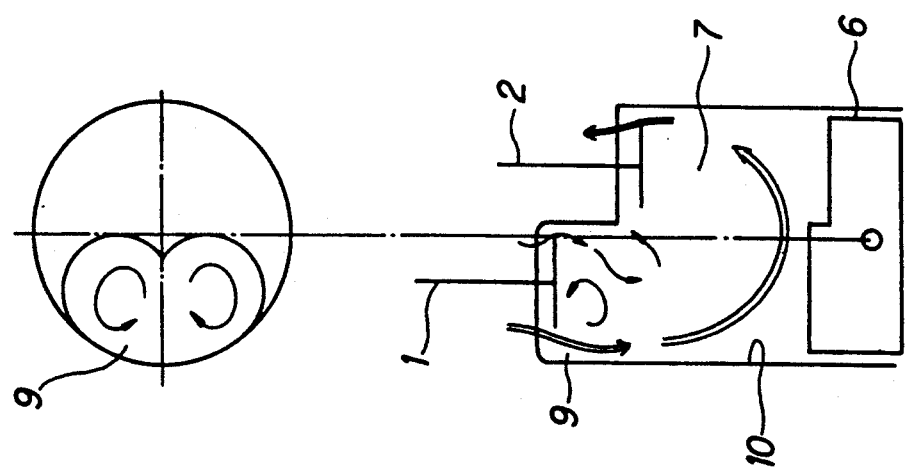

FIG. 4a shows the gas flow in the region of bottom dead center of the piston 6. As the gap between the rim of each intake valve 1 and the wall 17 of the cavity 9 is small, fresh gas flows into the chamber 7 mainly along the extension wall 16 which is continuous with the wall of the cylinder 10. It then collides with the piston head 15, veers to the sides, and veers again towards the exhaust ports 12.

Due to this loop-shaped flow of fresh gas, burnt gas in the chamber 7 is pushed towards the exhaust ports 12 and replacement of burnt gas of fresh gas is promoted. Further, as the fresh gas has a long flow path, its blowout from the exhaust ports 12 is limited. Further, the guide 24 at the bottom end of the circular wall 17 prevents fresh gas from flowing along this wall into the combustion chamber 7, so the loop-shaped flow is enhanced.

FIG. 4b shows the gas flow in the compression step. When the piston 6 approaches top dead center the volume of the combustion chamber 7 is effectively zero, air is blown strongly into the cavity 9, and symmetrical swirl flows are set up by the fresh gas led in by the wall 17 beneath the intake valves 1.

Fuel is then injected by the fuel injection valve 3 into the compressed air which has been pushed into the cavity 9 by the piston 6, as shown in FIG. 4c.

Figure 5A:
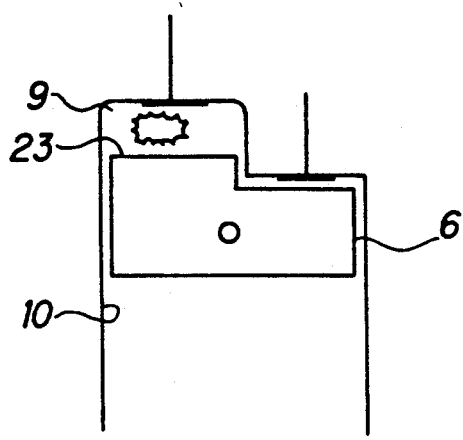
FIGS. 5a, 5b and 5c are schematic diagrams showing a propagation of combustion in the combustion chamber of the engine according to this invention.

The flow of fuel mist produced by the injection and air is divided by the edge 18 which projects in a V-shape into the cavity 9, and swirls along the wall 17. This promotes better mixing of fuel and air, and allows compression ignition to take place when the fuel is in a suitable state of dispersion as shown in FIG. 5a.

Figure 5B:
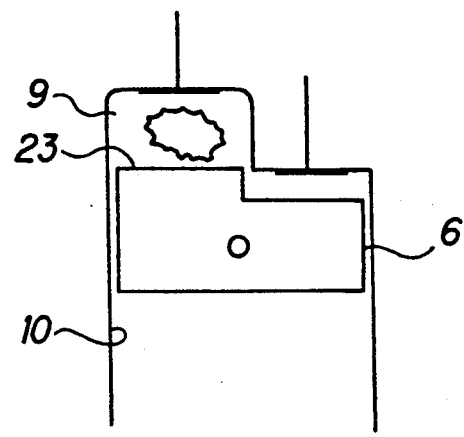
Figure 5C:
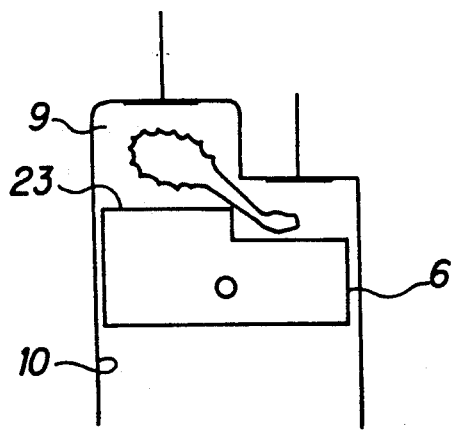

The combustion which begins in the cavity 9 first spreads through the cavity as shown in FIG. 5b, then as the piston 6 descends and the projection 23 leaves the cavity 9, the flame and unburnt fuel spread out into the combustion chamber 7 due to the energy of the combustion as shown in FIG. 5c, and the combustion continues to spread through the combustion chamber 7.

As the combustion gases are enclosed in the cavity 9 by the piston projection 23 within the crank angle range of 10–20 degrees when the piston 6 is descending from top dead center, the pressure and temperature in the cavity 9 rise, and the energy of combustion increases.

When the projection 23 leaves the cavity 9, therefore, fuel is ejected into the combustion chamber 7 with a great deal of force, and air is utilized more efficiently from the medium to the latter stage of combustion in the cylinder 10 so that less smoke is generated. Also, the guide 24 leads the fuel mixture along the extension wall 16 so that air utilization efficiency is further increased.

If a piston without the projection 23 is used, however, the cavity 9 is connected with the combustion chamber 7 each other as soon as the piston descends from its top dead center position. In this case, the fuel gases are enclosed in the cavity 9 for only a short period, and as the flow of gases from the cavity 9 to the combustion chamber 7 is completed in the vicinity of top dead center of the piston, the aforesaid dispersion of combustion are inadequate.

Further, since the volume of the combustion chamber 7 when the piston 6 is at top dead center, is set at 30–50% of the volume of the total combustion volume including the cavity 9, the combustion in the cavity 9 takes place with the theoretical or a richer air-fuel mixing ratio, and generation of NOx which tends to occur easily in the initial stage of combustion is suppressed.

Figure 6:
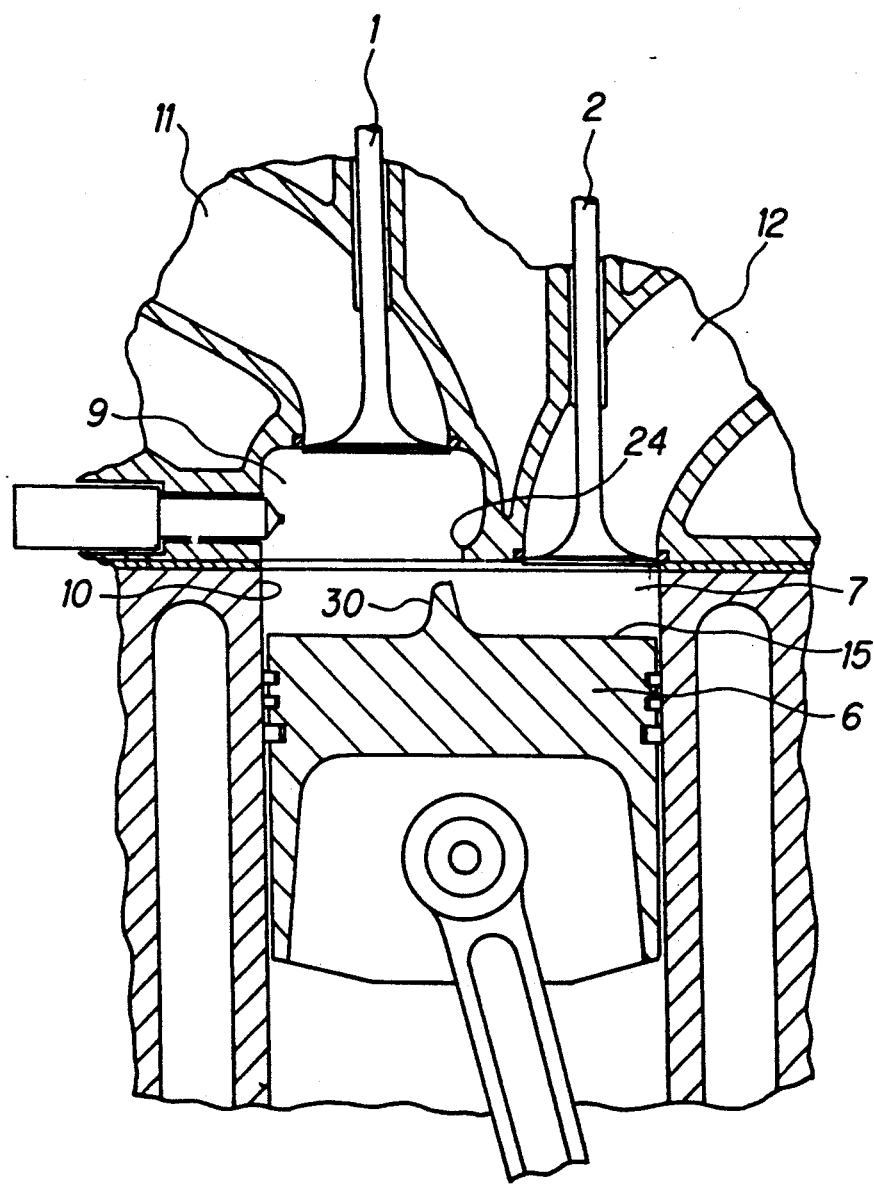
FIG. 6 is identical to FIG. 1 except that it shows another embodiment of this invention concerning a shape of a projection on a piston head.

If the piston head 15 is provided with a band-shaped projection 30 as shown in FIG. 6, the same desirable effects can be obtained as in the aforesaid embodiment. In this case, it is also possible to improve the balance of the piston 6 and reduce its weight.

Figure 7:
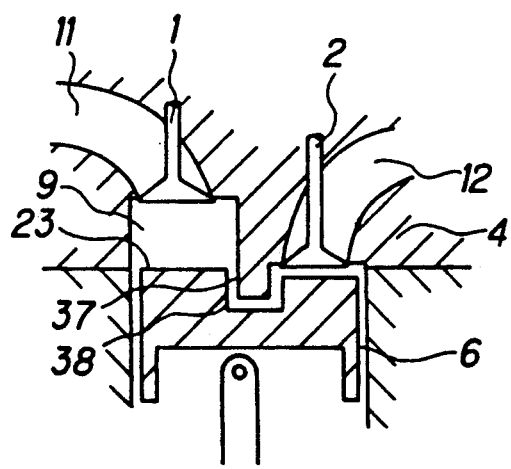
FIG. 7 shows yet another embodiment of this invention which shows a vertical section in outline of the combustion chamber along the central line of the cylinder.

As shown in FIG. 7, without modifying the projection 23, a band-shaped projection 37 may be provided projecting downwards at the interface between the flat surface 13 and the cavity 9 instead of the guide 24. In this case a groove 38 may be formed in the piston head 15 to accommodate the projection 37.

This improves the balance of the piston 6, and also improves the sealtightness of the cavity 9 in the vicinity of the top dead center of the piston 6.

The foregoing description of the preferred embodiments for the purpose of illustrating this invention is not to be considered as limiting or restricting the invention, since many modifications may be made by those skilled in the art without departing from the scope of the invention.

The embodiments of the invention in which an exclusive property or privilege is claimed are defined as follows:

1. A two stroke diesel engine having a cylinder with an open end, a cylinder head having a bottom surface which closes the open end of said cylinder, a piston accommodated in said cylinder such that it is free to slide in said cylinder between its top dead center and bottom dead center, said piston having a piston head facing said cylinder head, a combustion chamber formed in said cylinder by said piston head and said bottom surface, said combustion chamber having minimum capacity when said piston is at the top dead center, comprising;
   a cavity formed in said cylinder head with an opening in said bottom surface,
   an intake valve fitted to said cylinder head and pointing toward said cavity,
   a fuel injector fitted to said cylinder head and pointing toward said cavity,
   an exhaust valve fitted to said cylinder head outside said cavity and pointing toward said combustion chamber,
   a cavity wall located between said intake valve and exhaust valve, and
   a projection formed on said piston head such that it enters and separates said cavity from the combustion chamber when said piston is in the vicinity of the top dead center said projection having a band-shaped horizontal cross-section so that it enters into said cavity along said cavity wall at a constant distance therefrom when said piston is in the vicinity of the top dead center.

2. A two stroke diesel engine having a cylinder with an open end, a cylinder head having a bottom surface which closes the open end of said cylinder, a piston accommodated in said cylinder such that it is free to slide in said cylinder between its top dead center and bottom dead center, said piston having a piston head facing said bottom surface, a combustion chamber formed in said cylinder by said piston head and said bottom surface, said combustion chamber having a minimum capacity when said piston is at the top dead center, comprising;
   a cavity formed in said cylinder head with an opening in said bottom surface,
   a pair of intake valves fitted to said cylinder head and pointing toward said cavity,
   a fuel injector fitted to said cylinder head and pointing toward said cavity,
   a pair of exhaust valves fitted to said cylinder head outside said cavity and pointing toward said combustion chamber,
   a cavity wall located between said intake valves and exhaust valves, said cavity wall having a complex arc-shaped section being equidistant from a rim of each intake valve and forming an edge between said intake valves, and
   a projection formed on said piston head such that it enters said cavity to separate said cavity from combustion chamber when said piston head is in the vicinity of the top dead center.

3. A two stroke diesel engine as defined in claim 2, wherein said fuel injector has a substantially horizontal orientation and points toward the edge of said cavity wall.

4. A two stroke diesel engine having a cylinder with an open end, a cylinder head having a bottom surface which closes the open end of said cylinder, a piston accommodated in said cylinder such that it is free to slide in said cylinder between its top dead center and bottom dead center, said piston having a piston head facing said cylinder head, a combustion chamber formed in said cylinder by said piston head and said bottom surface, said combustion chamber having minimum capacity when said piston is at the top dead center, comprising;
   a cavity formed in said cylinder head with an opening in said bottom surface,
   an intake valve fitted to said cylinder head and pointing toward said cavity,
   a fuel injector fitted to said cylinder head and pointed toward said cavity,
   an exhaust valve fitted to said cylinder head outside said cavity and pointing toward said combustion chamber,
   a cavity wall located between said intake valve and exhaust valve,
   a guide formed at the opening of said cavity which leads fresh air from said intake valve toward the center of said cavity,
   a projection formed on said piston head such that it enters and separates said cavity from the combustion chamber when said piston is in the vicinity of the top dead center.

5. A two stroke diesel engine having a cylinder with an open end, a cylinder head having a bottom surface which closes the open end of said cylinder, a piston accommodated in said cylinder such that it is free to slide in said cylinder between its top dead center and bottom dead center, said piston having a piston head facing said cylinder head, a combustion chamber formed in said cylinder by said piston head and said bottom surface, said combustion chamber having minimum capacity when said piston is at the top dead center, comprising;
   a cavity formed in said cylinder head with an opening in said bottom surface,
   an intake valve fitted to said cylinder head and pointing toward said cavity,
   a fuel injector fitted to said cylinder head and pointing toward said cavity, an exhaust valve fitted to said cylinder head outside said cavity and pointing toward said combustion chamber, a cavity wall located between said intake valve an exhaust valve, a projection formed on said piston head such that it enters and separates said cavity from the combustion chamber when said piston is in the vicinity of the top dead center, p1 a band-shape projection projecting toward said piston head from said bottom surface of said cylinder head, said piston head having a groove formed thereon to accommodate said band-shape projection when said piston is in the vicinity of the top dead center.

* * * * *